United States Patent
Kjoller et al.

(10) Patent No.: US 11,226,285 B2
(45) Date of Patent: Jan. 18, 2022

(54) SURFACE SENSITIVE ATOMIC FORCE MICROSCOPE BASED INFRARED SPECTROSCOPY

(71) Applicant: Bruker Nano, Inc., Santa Barbara, CA (US)

(72) Inventors: Kevin Kjoller, Santa Barbara, CA (US); Craig Prater, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 16/628,908

(22) PCT Filed: Jul. 9, 2018

(86) PCT No.: PCT/US2018/041269
§ 371 (c)(1),
(2) Date: Jan. 6, 2020

(87) PCT Pub. No.: WO2019/010487
PCT Pub. Date: Jan. 10, 2019

(65) Prior Publication Data
US 2020/0217874 A1    Jul. 9, 2020

Related U.S. Application Data

(60) Provisional application No. 62/529,404, filed on Jul. 6, 2017.

(51) Int. Cl.
*G01N 21/35*    (2014.01)
*G01Q 30/06*    (2010.01)
(Continued)

(52) U.S. Cl.
CPC .......... *G01N 21/35* (2013.01); *G01N 21/359* (2013.01); *G01N 21/3563* (2013.01);
(Continued)

(58) Field of Classification Search
CPC .. G01N 21/35; G01N 21/359; G01N 21/3563; G01Q 60/34; G01Q 60/38;
(Continued)

(56) References Cited

U.S. PATENT DOCUMENTS 6,970,249 B1    11/2005  Lipson et al.
8,680,467 B2 *   3/2014  Prater ............... G01N 21/35
                                                  250/338.1
(Continued)

FOREIGN PATENT DOCUMENTS

WO    2010019256    2/2010

OTHER PUBLICATIONS

"Pushing the Sample-Size Limit of Infrared Vibrational Nanospectroscopy: From Monolayer toward Single Molecule Sensitivity" Xiaoji G. Xu, Mathias Rang, Ian M. Craig, and Markus B. Raschke, Jun. 18, 2012, The Journal of Physical Chemistry Letters 2012 3 (13), 1836-1841 DOI: 10.1021/jz300463d.*

*Primary Examiner* — Brooke Purinton
(74) *Attorney, Agent, or Firm* — Boyle Frederickson S.C.

(57) ABSTRACT

System and Methods may be provided for performing chemical spectroscopy on samples from the scale of nanometers with surface sensitivity even on very thick sample. In the method, a signal indicative of infrared absorption of the surface layer is constructed by illuminating the surface layer with a beam of infrared radiation and measuring a probe response comprising at least one of a resonance frequency shift and a phase shift of a resonance of a probe in response to infrared radiation absorbed by the surface layer.

18 Claims, 5 Drawing Sheets

(51) Int. Cl.
*G01Q 60/32* (2010.01)
*G01N 21/3563* (2014.01)
*G01Q 30/02* (2010.01)
*G01N 21/359* (2014.01)
*G01Q 60/34* (2010.01)
*G01Q 60/38* (2010.01)
*G01Q 30/04* (2010.01)
*G01Q 60/58* (2010.01)

(52) U.S. Cl.
CPC ............. *G01Q 30/02* (2013.01); *G01Q 30/04* (2013.01); *G01Q 30/06* (2013.01); *G01Q 60/32* (2013.01); *G01Q 60/34* (2013.01); *G01Q 60/38* (2013.01); *G01Q 60/58* (2013.01)

(58) Field of Classification Search
CPC ........ G01Q 30/02; G01Q 30/06; G01Q 60/32; G01Q 60/58; G01Q 30/04
See application file for complete search history.

(56) References Cited

U.S. PATENT DOCUMENTS

| | | | |
|---|---|---|---|
| 10,228,388 B2* | 3/2019 | Prater | G01N 21/35 |
| 10,557,789 B2* | 2/2020 | Prater | G01Q 60/32 |
| 2005/0212529 A1 | 9/2005 | Huang et al. | |
| 2006/0222047 A1 | 10/2006 | Reading | |
| 2008/0270082 A1* | 10/2008 | Batruni | G01R 31/31709 702/190 |
| 2008/0283755 A1* | 11/2008 | Dazzi | G01Q 60/38 250/339.07 |
| 2012/0167261 A1 | 6/2012 | Belkin et al. | |
| 2015/0034826 A1* | 2/2015 | Prater | G01Q 60/32 250/339.07 |
| 2018/0306837 A1* | 10/2018 | Sadeghian Marnani | G01Q 60/32 |

* cited by examiner

SURFACE SENSITIVE ATOMIC FORCE MICROSCOPE BASED INFRARED SPECTROSCOPY

CROSS-REFERENCE TO RELATED APPLICATIONS

This application is a national stage application of PCT/US2018/041269, filed Jul. 9, 2018, which claims priority under 35 USC § 1.119(e) to U.S. Provisional Patent Application Ser. No. 62/529,404, filed Jul. 7, 2017. The subject matter of these applications are hereby incorporated by reference in their entirety.

BACKGROUND

The specification relates to scattering Atomic Force Microscope based infrared spectroscopy (AFM-IR) in particular for acquiring information indicative of the distribution of chemical components in heterogeneous systems.

AFM-IR may be a useful technique for measuring and mapping optical properties/material composition of some surfaces with resolution approaching nanometer scale. Various aspects of the technique are described in U.S. Pat. Nos. 8,869,602, 8,680,457, 8,402,819, 8,001,830, 9,134,341, 8,646,319, 8,242,448, and U.S. patent application Ser. Nos. 13/135,956, 15/348,848, and 62/418,886 by common inventors and commonly owned with this application. These applications are incorporated by reference in their entirety.

In the traditional AFM-IR technique, sample preparation can be a challenge. The technique relies on measuring the sample expansion created by absorption of the IR illumination inducing heating of the sample. This expansion generates motion in the AFM cantilever which is measured by typical AFM deflection detection techniques. The strength of the signal is dependent on a number of parameters related to the sample and cantilever such as the spring constant of the cantilever, the thermal expansion of the sample and the penetration depth of the IR illumination. With a sample which has a thick absorbing region, the AFM-IR signal can be strong but the spatial resolution can degrade due to heat diffusion within the sample leading to non-local (as defined by the AFM tip) expansion. By preparing a sample as a thin layer on a non-absorbing or low thermal expansion substrate, the optimum spatial resolution can be achieved. This preparation can be accomplished using a number of different sample preparation techniques, such as drop casting, spin coating, microtomy, etc. However, some types of samples do not allow usage of these preparation techniques, such as a thin organic coating or layer on an organic substrate. In this type of sample the IR light can penetrate beyond the thin top layer into the underlying substrate. The IR light will then be absorbed in the substrate creating expansion which is an integration of the expansion over the full penetration depth of the IR illumination. This can mask the signal from the top layer. Moreover, this sample measurement can be especially challenging if the top layer is very thin (less than a few hundred nanometers) and/or has a chemistry which is similar to the substrate. In that case, the resultant signal may be dominated by the contribution from the thicker layer, with only a small modulation contributed by the thinner layer. As a result, an AFM-IR solution that accommodates distinguishing between layer of differing thickness (e.g., an organic thin layer and a thicker substrate, such as a thick polymer layer) was desired.

SUMMARY

Systems and Methods may be provided for performing chemical spectroscopy on samples from the scale of nanometers with surface sensitivity even on very thick samples.

In order to address these above-noted drawbacks a new method has been developed which has shown significantly better surface sensitivity. This patent describes the method and its benefits in any application where the top surface layer is of interest. This can include thin surface coatings or films, surface contamination or in composite materials non uniform distribution of the materials relative to the depth from the surface.

Definitions

"Optical property" refers to an optical property of a sample, including but not limited to index of refraction, absorption coefficient, reflectivity, transmissivity, transmittance, absorbance, absorptivity, real and/or imaginary components of the index refraction, real and/or imaginary components of the sample dielectric function and/or any property that is mathematically derivable from one or more of these optical properties.

"Interacting a probe with a sample" refers to bringing the probe tip close enough to the surface of a sample such that one or more near field interactions occur, for example the attractive and/or repulsive tip-sample forces, and/or the generation and/or amplification of radiation scattered from an area of the sample in proximity of the probe apex. The interaction can be contact mode, intermittent contact/tapping mode, non-contact mode, pulsed force mode, PeakForce Tapping® (PFT) mode and/or any lateral modulation mode. The interaction can be constant or as in some embodiments, periodic. The periodic interaction may be sinusoidal or any arbitrary periodic waveform. Pulsed force modes and/or fast force curve techniques may also be used to periodically bring the probe to a desired level of interaction with a sample, followed by a hold period, and then a subsequent probe retraction.

"Illuminating" means to direct radiation at an object, for example a surface of a sample, the probe tip, and/or the region of probe-sample interaction. Illumination may include radiation in the infrared wavelength range, visible, and other wavelengths from ultraviolet to THz. Illumination may include any arbitrary configuration of radiation sources, reflecting elements, waveguiding elements such as fibers, focusing elements and any other beam steering or conditioning elements.

"Infrared light source" for the purposes of this specification refers to one or more optical sources that generate or emits radiation in the infrared wavelength range. For example it can comprise wavelengths within the mid-IR (2-25 microns). An infrared light source may generate radiation over a large portion of these wavelength sub-regions, or have a tuning range that is a subset of one of the wavelength ranges, or may provide emission across multiple discrete wavelength ranges, for example 2.5-4 microns, or 5-13 microns, for example. The radiation source may be one of a large number of sources, including thermal or Globar sources, laser-driven plasma sources, supercontinuum laser sources, frequency combs, difference frequency generators, sum frequency generators, harmonic generators, optical parametric oscillators (OPOs), optical parametric generators (OPGs), quantum cascade lasers (QCLs), nanosecond, picosecond, femtosecond and attosecond laser systems, CO2 lasers, heated cantilever probes or other microscopic heaters, and/or any other source that produces a beam of radiation, either in pulsed or in continuous wave operation. The source may be narrowband, for example with a spectral width of <10 cm$^{-1}$ or <1 cm$^{-1}$ or less, or may be broadband, for example with a spectral width of >10 cm$^{-1}$, >100 cm$^{-1}$ or greater than 500 cm$^{-1}$. "Near infrared light" generally refers to a wavelength range of IR light corresponding to 0.75-2 µm.

"Signal indicative of" refers to a signal that is mathematically related to a property of interest. The signal may be an analog signal, a digital signal, and/or one or more numbers stored in a computer or other digital electronics. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

"Spectrum" refers to a measurement of one or more properties of a sample as a function of wavelength or equivalently (and more commonly) as a function of wavenumber.

"Infrared absorption spectrum" refers to a spectrum that is proportional to the wavelength dependence of the infrared absorption coefficient, absorbance or similar indication of IR absorption properties of a sample. An example of an infrared absorption spectrum is the absorption measurement produced by a Fourier Transform Infrared spectrometer (FTIR), i.e. an FTIR absorption spectrum. (Note that IR absorption spectra can also easily be derived from transmission spectra.)

"Modulating" or "modulation" when referring to radiation incident on a sample refers to changing the infrared laser intensity at a location periodically. Modulating the light beam intensity can be achieved by means of mechanical chopping of the beam, controlled laser pulsing, and/or deflecting the laser beam, for example by a tilting mirror that is driven electrostatically, electromagnetically, with piezo actuators or other means to tilt or deform the mirror, or high speed rotating mirror devices. Modulation can also be accomplished with devices that provide time varying transmission like acousto-optic modulators, electro-optic modulators, photo-elastic modulators, pockel cells, and the like. Modulation can also be accomplished with diffraction effects, for example by diffractive MEMS-based modulators, or by high speed shutters, attenuators, or other mechanisms that change the intensity, angle, and/or phase of the laser intensity incident on the sample.

"Demodulate" or "demodulation" refers to extracting an information-bearing signal from an overall signal, usually, but not necessarily at a specific frequency. For example in this application, the collected probe light collected at a photo detector represents an overall signal. The demodulation process picks out the portion that is being perturbed by infrared light absorbed by the sample. Demodulation can be accomplished by a lock-in amplifier, a fast Fourier transform (FFT), a calculation of a discrete Fourier component at a desired frequency, a resonant amplifier, a narrow band bandpass filter, or any other technique that largely enhances the signal of interest while suppressing background and noise signals that are not in sync with the modulation. A "demodulator" refers to a device or system that performs demodulation.

A "analyzer/controller" refers to a system to facilitate data acquisition and control of the system. The controller may be a single integrated electronic enclosure or may comprise multiple distributed elements. The control elements may provide control for positioning and/or scanning of the probe tip and/or sample. They may also collect data about the probe deflection, motion or other response, provide control over the radiation source power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. Memory elements configured to store computer programs, which may execute from memory, may be implemented along with discrete circuit components to carry out one or more of the processes described herein.

A "lock-in amplifier" is one example of a "demodulator" (defined above) and is a device, system, and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light, a phase transition, or other response of a material due to the interaction with radiation.

"Sideband frequency" refers to a frequency that is a linear sum or difference of two excitation frequencies. For example, if a system is excited at frequencies $f_1$ and $f_2$, a sideband frequency can be any frequency $f_{sb}$ that satisfies $f_{sb}=|\pm f_1 \pm f_2|$. More generally, in some cases a sideband frequency can also be a linear sum or difference of one of more harmonics of the excitation frequencies, i.e. $f_{sb}=|\pm mf_1 \pm nf_2|$, where m and n are integers.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

The current disclosure is directed towards obtaining measurements of infrared optical properties of a material on a length scale much, much smaller than the diffraction limit of the infrared wavelengths employed, and in fact down to the nanometer scale, with the ability to perform surface sensitive IR spectroscopy, even on thick samples with strong IR absorption. This is achieved by the use of a contrast mechanism that is highly sensitive to the temperature of the sample surface.

Figure 1A:
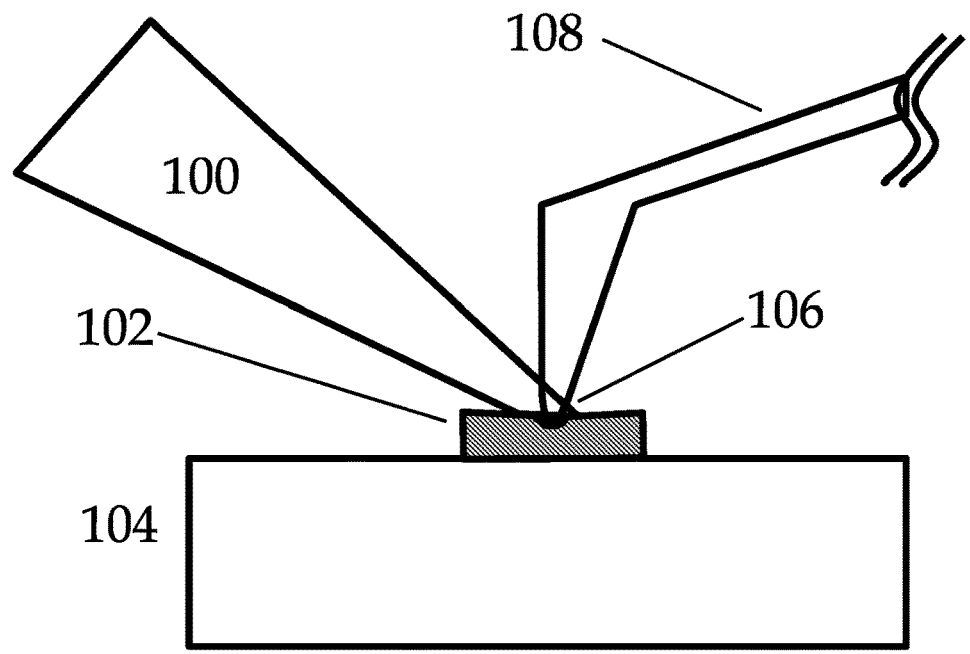
FIGS. 1A and 1B show simplified schematic diagrams of an illustrative embodiment including capability to perform surface sensitive AFM-IR measurements.
Figure 1B:
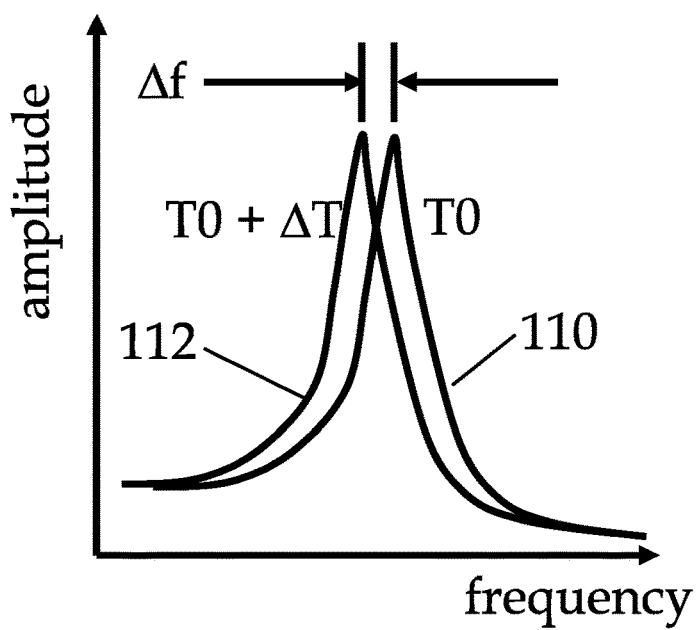

The current disclosure describes a method and apparatus for obtaining high sensitivity IR absorption spectra from nanoscale regions of a sample with a high degree of surface sensitivity that is simultaneously highly insensitive to IR absorption of sub-surface layers, including very thick layers. Referring to FIG. 1A, a beam of IR radiation 100 is focused onto a region of a thin sample of interest 102 on a much thicker substrate 104. It is desirable to measure the IR absorption of the thin region 102 without having the measurement heavily contaminated by the IR absorption of the underlying substrate 104. To measure the IR absorption properties of the thin sample 106, the apex 106 of an AFM probe 108 is brought into interaction with the surface of thin sample 106. As the probe apex 106 interacts with the surface of thin sample 102, the cantilever 108 will exhibit one or more resonant frequencies, for example as indicated with curve 110 in FIG. 1B. These resonances may be resonances associated with static contact between the probe apex and sample (so called contact resonances) or may be associated with resonances of the cantilever in dynamic operation, e.g. tapping, intermittent contact or other schemes involving periodic interacting between the tip and sample. All of these resonance frequencies can shift due to a change in temperature of the sample. In the current embodiment, when the IR beam 100 is tuned to an absorption of the thin sample 102 in FIG. 1A, the absorbed IR radiation turns into heat, raising the temperature of the sample 102. This temperature increase $\Delta T$ can cause a resulting shift in the cantilever resonant frequency. For example, the resonance 110 in FIG. 1B may shift to a lower frequency, as shown in curve 112. The temperature change $\Delta T$ can thus result in a resonance frequency shift $\Delta f$. This resonance frequency shift can then be measured as a function of wavelength of the IR beam 100 to construct an IR absorption spectrum for the region of sample 102 in contact with the probe apex 106. The AFM probe may locally enhance the electric field produced by the incident IR beam 100, resulting in a larger local temperature increase in the surface layer just under the tip apex. This can also help magnify the contribution of the relative impact of the surface layer versus that of a substrate or other buried layers that are farther from the field enhancing tip apex. Although AFM cantilever probes were used to describe the above embodiment, the surface sensitive technique described above can also be applied to other forms of scanning probes, for example tuning fork probes, or MEMS devices with sharp probes attached, as long as an interaction between the tip and sample can result in a shift in one or more resonances of the device.

Figure 2A:
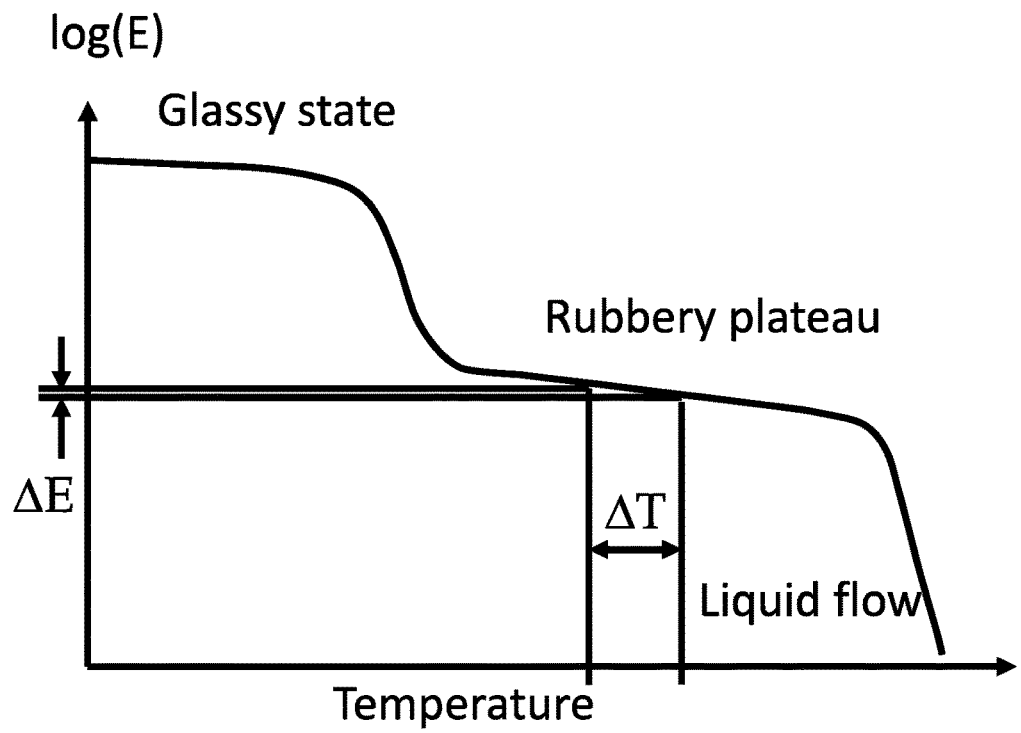
FIGS. 2A and 2B illustrate a mechanism by which absorption of IR radiation in the sample can result in a shift in a resonance frequency of an AFM probe.
Figure 2B:
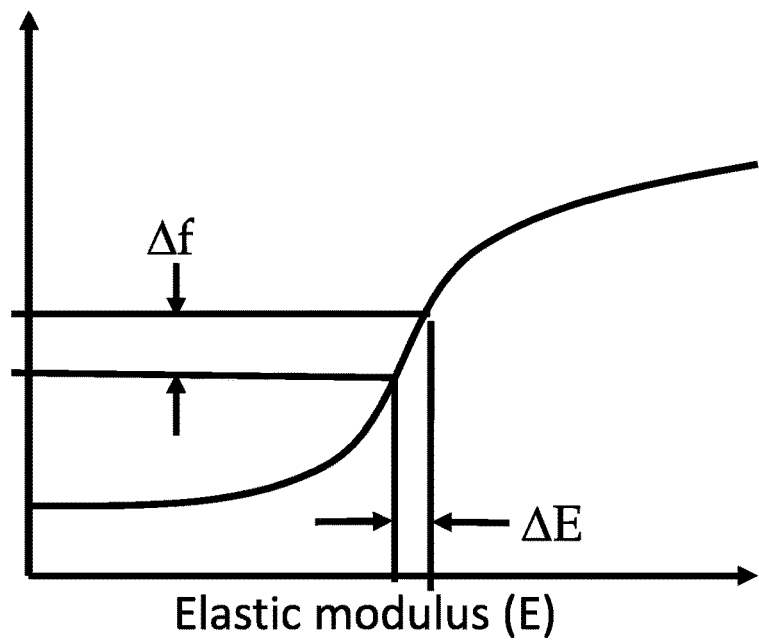

FIGS. 2A and 2B show one mechanism that can result in temperature dependent changes in probe resonant frequency. FIG. 2A shows a diagram showing the typical dependence of elasticity (E) as a function of temperature and the corresponding material states, glassy, rubbery and liquid for many polymeric materials. Although the detailed behavior may be quite complex over large temperature ranges and different material phases, over any small temperature range, there is usually a moderate change in elastic modulus with temperature. The scale of the elastic modulus change can vary dramatically, depending on whether the material is in a glassy, rubber or liquid regime, but in all regimes, there is a change in elasticity with temperature. So as the sample absorbs IR light and heats up an amount $\Delta T$, there is a resulting change $\Delta E$ in the elastic properties of the sample. (There can also be changes in viscoelastic properties, including changes in material damping/dissipation as well.) Turning to FIG. 2B, this change in elasticity of the sample can have a commensurate effect on the resonance of the AFM cantilever probe. The viscoelasticity of the probe sample contact acts as spring/dashpot system that affects the resonance frequency of the cantilever probe when the probe apex is in interaction with the surface of the sample. So as the elastic modulus E of the sample changes an amount $\Delta E$, the resonance frequency can change as well an amount $\Delta f$. So for a given amount of IR absorption, the result is a temperature increase, which generally results in an elasticity decrease, and this will generally lead to a decrease in the resonance of the cantilever probe while interacting with the sample. So by measuring the probe resonance frequency or by proxy measuring the cantilever oscillation phase, it is possible to generate a signal that is indicative of the IR absorption of the region of the sample. And, advantageously, this resonance frequency is only sensitive to the surface or near surface of the sample and is minimally sensitive to elasticity of material well below the sample surface. Because of this, it is possible to obtain IR absorption spectra on very thick samples without substantial contamination of the absorption of underlying layers.

The reason that this technique is so highly surface sensitive is that the changes in resonant frequency of the AFM cantilever probe result only from the interactions within a short distance from the apex of the AFM probe. That is, changes in resonant frequency of the AFM cantilever are dependent on the viscoelastic properties of the sample material only within a few nanometers or tens of nanometers of the AFM probe tip. The AFM cantilever resonance is thus highly insensitive to the viscoelastic properties of material deep within a sample. Specifically, the cantilever resonance is typically sensitive to the material properties very close to the surface, for example in some cases of the sample of order of the diameter of the contact area between the probe tip apex and sample. The probe contact can be on the scale of a few nanometers to a few tens of nanometers across, depending on the probe sharpness, contact force, and sample viscoelasticity.

Note that other temperature dependent properties can also affect the cantilever resonant frequency and/or phase. For example, the temperature increase can also cause changes in friction, adhesion, and damping. Any of these properties can cause a shift in the probe resonance frequency. Additionally, thermal expansion of the sample and/or tip that can cause changes in the probe loading force that can also shift the probe resonance frequency and/or phase. Note for this technique to work, it is not strictly necessary to know the exact mechanism that is dominant. It is sufficient that a change in temperature in the surface of the sample causes a measurable change in the properties of the sample that can cause a phase or frequency change in the probe. As will be discussed later, it is also possible to measure and correct for any nonlinearities in the specific mechanism that converts temperature change into resonant frequency and/or phase change.

Figure 3A:
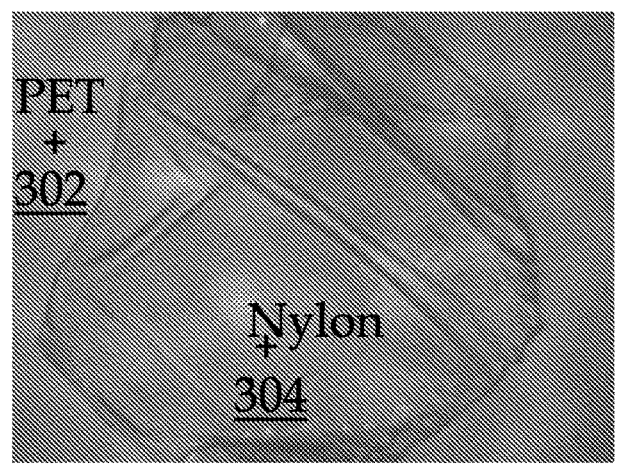
FIGS. 3A and 3B show an example measurement of a surface sensitive AFM-IR measurement on a sample of a thin layer of nylon on a thick film of polyethylene terephthalate PET.
Figure 3B:
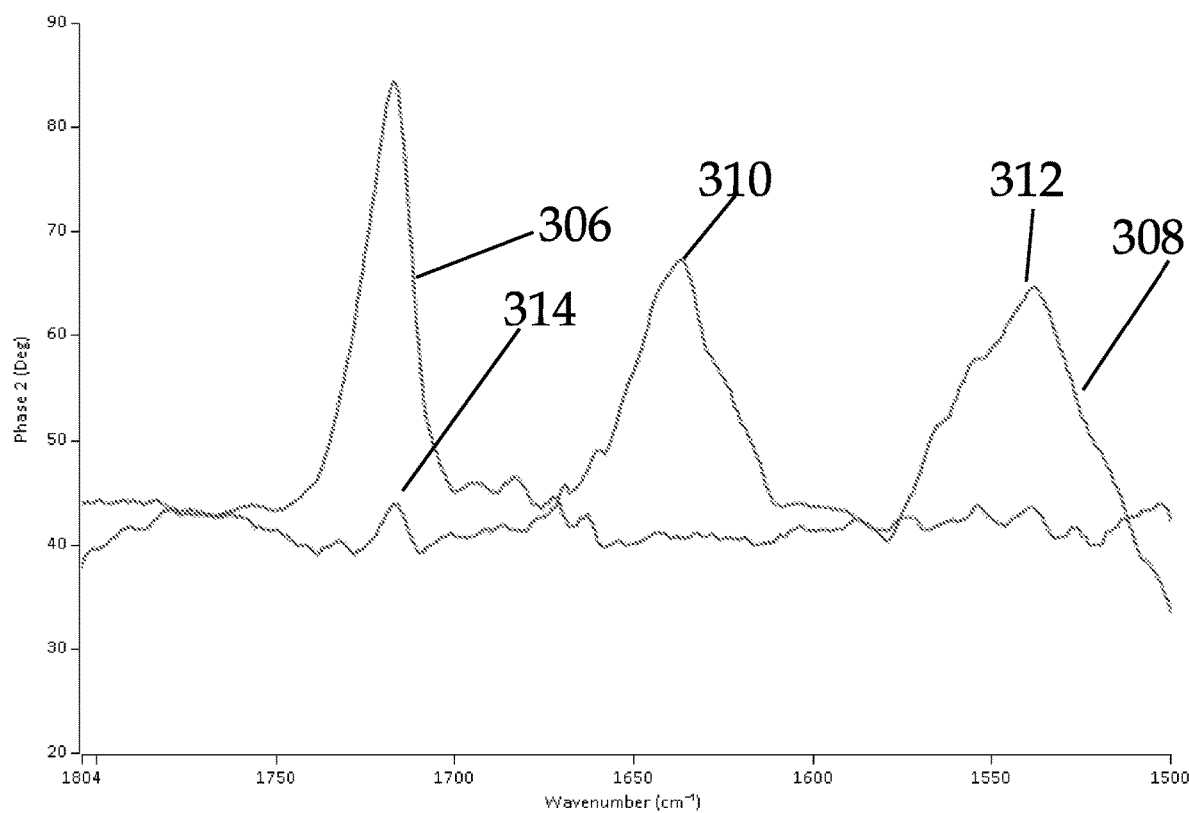

FIGS. 3A and 3B show an example measurement of a surface sensitive AFM-IR measurement on a sample of a thin layer of nylon on a thick film of polyethylene terephthalate (PET). FIG. 3A shows an optical microscope image 300 of a region of a sample that comprises a thick layer of PET, 250 micrometers thick, with a thin layer of nylon on top. The nylon layer has been microtomed to a thickness of around 300 nm and deposited on the much thicker PET. FIG. 3B shows AFM-IR spectra obtained under the current embodiment at regions 302 and 304 shown in the optical microscope image 300 in FIG. 3A. The spectra were obtained by measuring the phase shift of a contact mode resonance of an AFM cantilever while sweeping the wavenumber (or equivalently wavelength) of the IR laser illuminating the sample. As the contact mode resonance changes with the amount of absorbed light, the effect of this resonance change can be recorded quickly by measuring the phase change. The reason for this is that if the cantilever is driven into oscillation at a fixed frequency, if the cantilever resonance frequency changes due to the absorbed IR light (and resulting temperature increase and change in sample mechanical properties), there will be a corresponding change in phase as explained in association with FIG. 4 below. The key thing to note in FIG. 3B is that the absorption peaks 310 and 312 that are associated with IR absorption of the nylon are about 5× bigger than the peak 314 which is the residual effect of the carbonyl peak from the underlying PET material. So the nylon absorption bands are 5× bigger than the residual PET peak, despite the fact that the PET film is more than 800× thicker than the nylon layer (250,000 nm versus 300 nm). The residual carbonyl peak 314 from the PET in spectrum 308 is also attenuated by about 8× from the measurement 306 directly on the PET. This plot demonstrates the ability of the current embodiment to perform "thin on thick" measurements, i.e. to perform chemical analysis of a thin surface layer, despite the large potential background of IR absorption of a much thicker underlayer. And specifically, we have demonstrated the ability to obtain IR spectra on surface layers on thick films that are more than 800× thicker than the surface film. This represents a breakthrough in the ability to measure samples like surface coatings on thick substrates.

Figure 4:
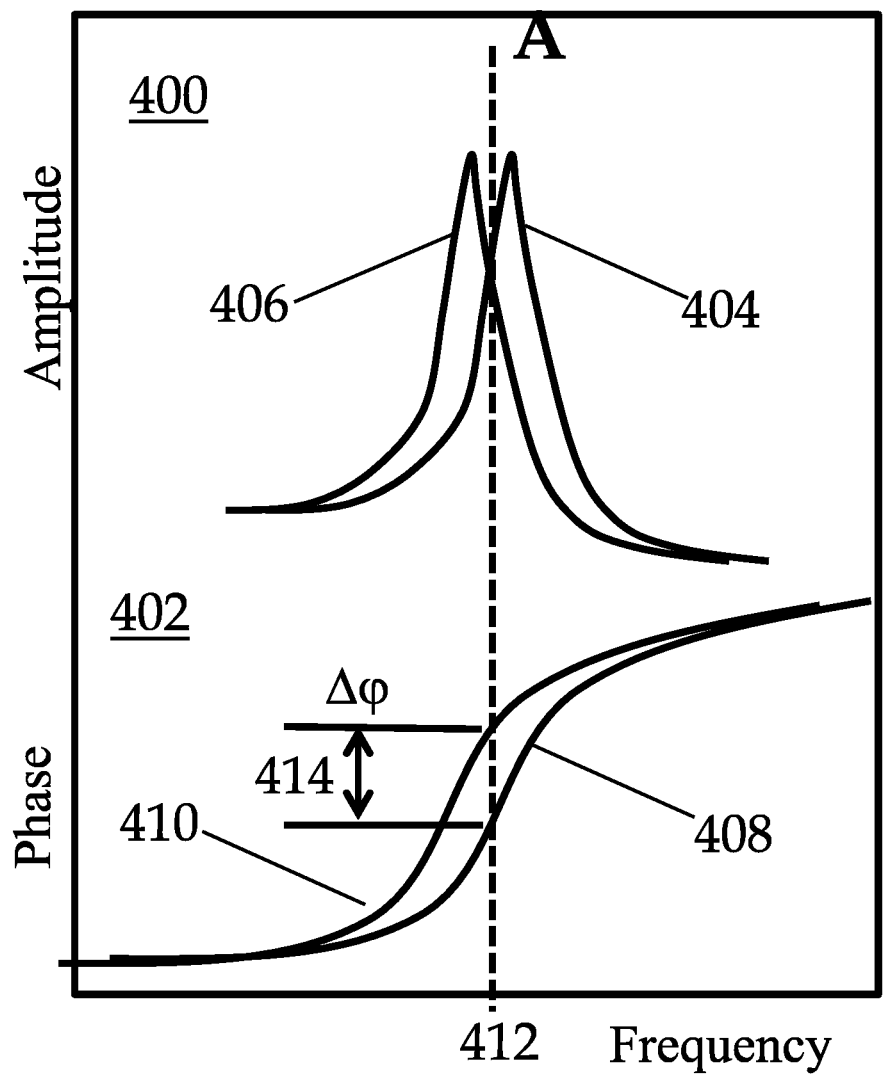
FIG. 4 illustrates how a heating induced change in AFM probe resonance frequency can result in an associated change in the probe's oscillation phase.

The spectra in FIG. 3B comprised measurements of phase of the cantilever oscillation as a function of wavenumber of the IR source. The following discussion explains why the phase signal can be used as a signal indicative of the IR absorption. An example of the relationship between a cantilever resonance and the cantilever phase is shown in FIG. 4. Plot 400 shows two cantilever resonances, 404 with no IR absorption and 406 when the IR absorption has caused a temperature induced shift in the resonance peak. The corresponding phase curves are shown in plot 402, with phase curve 408 corresponding to the case with no absorption and plot 410 after the resonance frequency has shifted due to the IR absorption induced temperature change. If the system is driven into oscillation at a fixed frequency 412, there will be a corresponding change in phase $\Delta\varphi$ (414) associated with the IR absorption. Thus plotting this phase signal as a function of the wavelength or wavenumber of the IR source results in a localized IR absorption spectrum. Because the position of this resonance is only dependent on the mechanical properties of the surface material within a small distance of the probe apex, we can obtain a highly surface sensitive measurement of the IR absorption.

The phase or frequency signal can be measured in one or more ways. For the measurement shown in FIG. 3, the phase was measured by modulating the IR light at a frequency near a contact resonance of the cantilever. In can also be performed measuring at a tapping/intermittent contact resonance and/or a sideband frequency. Additionally, the phase or resonant frequency does not need to be measured with the modulation of the IR beam. Alternately, the resonance frequency and/or phase can be measured with mechanical excitation of the cantilever, for example with a piezoelectric element, or electrostatically, magnetically, via ultrasound, thermal bending, via bimetallic bending, via photothermal excitation of the cantilever, or other methods to drive the cantilever into oscillation. It can be advantageous, for example, to modulate the IR source at very high frequencies to create a short thermal diffusion length, but then measure the cantilever resonance properties at a different frequency that provides more sensitive detection of the cantilever phase and/or frequency.

Although the relationship between phase shift and frequency shift is roughly linear for small frequency shifts and small phase shifts, it is non-linear for larger frequency shifts. It may be desirable to convert the phase spectra into equivalent absorption spectra by scaling the phase curves by the nonlinear relationship between phase and frequency. Alternately, the whole data chain can be linearized if necessary, i.e. correcting for nonlinearities in frequency shift with sample elasticity and sample elasticity with temperature. This linearization process can be performed by first performing a calibration sequence, for example measuring the change in elasticity of a sample as a function of temperature, by raising the temperature of the sample by a known amount or in known increments. Similarly, the nonlinearity of the change in the cantilever resonance with sample elasticity can be calibrated on reference samples with known elastic modulus, or again by measuring the change in contact resonance as a function of known sample temperature. Under certain conditions, the expected nonlinear dependence can by calculated analytically or by finite element methods. Publications by Rabe, Stark and others provide analytical expressions for shift in resonance frequencies in interaction with a sample surface (for example see Rabe, U.; Arnold, W.; Janser, K., Vibrations of free and surface-coupled atomic force microscope cantilevers. Theory and experiment. 1996; and Rabe, U.; Kopycinska, M.; Hirsekorn, S.; Arnold, W., Evaluation of the contact resonance frequencies in atomic force microscopy as a method for surface characterisation (invited). *Ultrasonics* 2002, 40 (1-8), 49-54; and Stark, R.; Schitter, G.; Stark, M.; Guckenberger, R.; Stemmer, A., State-space model of freely vibrating and surface-coupled cantilever dynamics in atomic force microscopy. *Phys. Rev. B* 2004, 69 (8).) The nonlinear shift of phase with resonance frequency shift can also be calibrated for example by interacting the probe with different samples, or samples at different temperatures, and/or interacting the probes with the sample at different interaction forces. Additionally it is possible to apply analytical or finite element models, for example simple harmonic oscillatory models, Euler Bernoulli type models or other analytical techniques. Applying these techniques to linearize the spectra can be highly desirable in cases that the absorption bands of interest occur over a large dynamic range, for example ranging from very strong absorption bands to very weak bands. In these cases, linearizing the response can be desirable to enable better matching between AFM-IR spectra and materials spectral databases and/or for quantification of material concentrations. But for small increases in temperature, e.g. of order a few degrees or less, this linearization may not be necessary, especially away from temperatures where the sample surface undergoes a material transition, e.g. a glass transition or melt.

In another embodiment it is also possible to linearize the response by measuring the probe response as a function of the power of the incident IR beam on the sample. At a given absorption band, the temperature increase in the sample varies linearly with incident power of the IR beam. By varying the IR beam power and measuring the resulting probe response (e.g. the probe resonance frequency and/or phase) it is possible to directly construct a calibration between temperature and phase or frequency. This provides a one-step process for calibrating all of the nonlinearity between sample temperature and measured probe response.

Note that it is also possible to automatically select a region with sufficiently low amounts of non-linearity. Specifically, the laser power can be adjusted over a range of power to simulate the likely dynamic range of the temperature increases in the sample over a plurality of absorption bands. If the probe response is sufficiently linear over the range of IR laser power used, it may not be necessary to linearize the probe response to generate a signal that is adequately indicative of the IR absorption of the surface layer. Performing this test can also help avoid power levels that could provoke a nonlinear material response, e.g. resulting from the material temperature rising enough to go through a softening transition, for example a glass to rubber transition or a melt.

Figure 5:
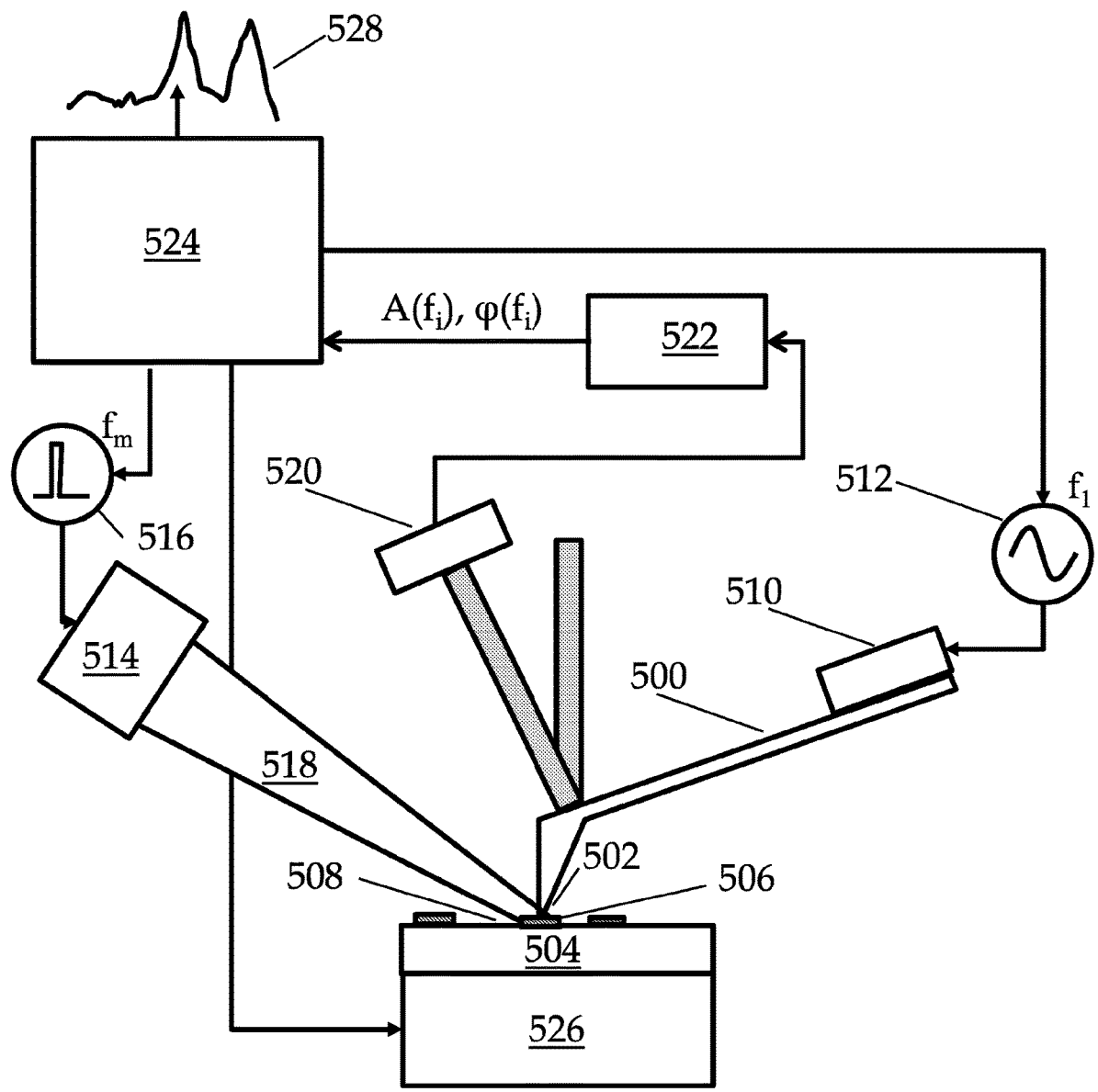
FIG. 5 shows a simplified schematic diagram of an embodiment of surface sensitive AFM-IR.

FIG. 5 shows a schematic diagram of an embodiment of a surface sensitive AFM-IR system. A probe tip 502 of a scanning probe microscope is interacted with a region 506 of a sample 504. In one embodiment, the probe comprises a cantilever 500 that is oscillated by an actuator 510 at at least one frequency $f_1$ driven by signal generator 512. The actuator is most commonly a piezoelectric element, but it can also comprise alternate drive mechanisms including magnetic, electrostatic, thermal, optical force or other schemes that apply an oscillatory force on the cantilever to drive it into oscillation. In one embodiment the frequency $f_1$ may be selected to correspond to a resonance of cantilever 500, but in other embodiments this is not necessary. A beam of infrared radiation 518 from an infrared light source 514 is used to illuminate a sample 504 in the vicinity of the tip 502 and the region of interest of the sample 506. In one embodiment, the probe response is measured via a deflection detection system 520, for example an optical lever system used to measure position, deflection, bend, and/or motion of the cantilever probe.

It can be desirable to discriminate changes in the probe response from IR absorption (the signal of interest) from parasitic effects that can cause shifts in the probe response. For example, cantilever resonance frequency and/or phase can also change due to environmental temperature changes, changes in humidity, drift in the tracking force, change in the contact area, and other factors such as heating and possible bending/distortion of the cantilever itself during IR illumination. To eliminate these issues from causing noise in the spectra, it can be desirable to do a differential measurement. For example, it is possible to rapidly compare the probe response with the IR source on and off. Measurements with the IR source off can provide information about drifts in the cantilever frequency/phase shift that are independent of the sample temperature rise due to IR absorption. It is also possible to pulse or modulate the IR source at one frequency and drive the cantilever into oscillation at another frequency with an alternative drive scheme, for example a piezo actuator or one or more of the other methods described elsewhere. In this case it is possible to use the non-laser driven resonance to track drifts in the probe resonance frequency/phase when the laser is not pulsing or not on. Note that this need not add any measurement time to the measurement process. For example, many pulsed IR sources operate at low duty cycle, a few percent or less. So there is ample time during the time between pulses to perform a separate measurement of the probe frequency/phase while the laser is off and the sample is relaxed back to a default thermal state. This baseline response can then be subtracted from the probe response measured as a function of wavelength/wavenumber with the IR laser pulsing.

The illumination system may include any number of lenses, mirrors, attenuators, polarizers, pinholes, waveguides (fibers), beam steering elements to direct and condition the beam prior to arriving at the tip-sample region. In general, the light is focused to a spot, although in general the focused light spot is much larger than the tip-sample interaction region. The focusing optics may include lenses and/or reflective focusing elements, for example parabolic mirrors, including off axis parabolic mirrors. The light, however, is often further "nanofocused" and/or intensified by the probe tip geometry and/or surface coating leading to an intensification of the electric field felt at the sample as a result of the incident radiation.

The radiation incident on the sample may interact with the sample and produce a detectable response. For example, if the wavelength of the IR radiation is tuned to an absorption band of the sample material, a portion of the incident radiation will be absorbed. The absorbed radiation can cause heating of the sample region, in turn resulting in a temperature rise and a thermal expansion of the absorbing region, but also a temperature dependent shift in the mechanical properties of the sample, as described previously. The incident radiation may also induce a force on the probe tip, either through the thermal expansion and/or through interactions of the electric field of the probe and the electric field of the sample, and/or it may cause a shift in a resonant frequency of the AFM probe. In any case, a probe response can be measured in response to the radiation incident on the sample by one or more detection systems in the scanning probe microscope. The probe response can be elicited by measuring a temperature rise in the probe, a deflection, oscillation or force on the probe, one or more resonant frequencies, and/or oscillation phases of the probe. By changing the wavelength emitted from the radiation source to a wavelength absorbed by another material component, it is possible to map the distribution of that component. Measuring the probe response at a plurality of wavelengths (or equivalently wavenumbers) will result in a spectrum that is representative of the optical response of the sample, or in specific cases an IR absorption spectrum.

In one embodiment, the radiation beam 518 is modulated at least one frequency $f_m$. This modulation may comprise an intensity modulation, an angle modulation or other modulation that creates a periodic variation in the strength of the radiation incident on the sample in the vicinity of the probe tip. The modulation may comprise a series of pulses or may be sinusoidal in nature or other arbitrary waveform shape with a periodic component at frequency $f_m$. In the case of a pulsed source, the modulation frequency $f_m$ can refer to the pulse repetition rate of the pulsed source. In one embodiment, the modulation may be accomplished for example by providing a modulation signal, a gating pulse, an external trigger or sync pulse to light source 514 that electronically modulates the intensity of the beam of radiation. Alternately, this modulation may be accomplished via an external modulator, for example a chopper, an electrooptic modulator, an electroacoustic modulator, a photoelastic modulator, an electronic shutter, a MEMS mirror, a high speed galvo, a piezo driven mirror or any other device that can periodically adjust the intensity and/or angle of a light beam that passes through the modulator. The light source may also be modulated by providing an analog modulation signal, for example to modulate the voltage and/or current provided to a light source, for example a quantum cascade laser.

In a specific embodiment a lock-in amplifier 522 can measure the oscillatory response of the probe 500, for example the amplitude A and/or phase φ of the probe at a one or more frequencies $f_i$, including the modulation frequency and/or one or more sideband frequencies. A controller 524 can read in data from the deflection detector 520, the lock-in amplifier 522 and other auxiliary signals as desired. The controller 524 can also output pulses 516 to control the modulation of light source 514 or to an external modulator. Alternately it can simply send analog or digital commands to change the modulation rate of the light source. Controller 524 can also control the position of scanner 526 to control the relative tip/sample position. It can also be used to adjust any of the probe interaction parameters including the oscillation frequency (or frequencies) and amplitude(s) of the probe, the amplitude setpoint, scan speed parameters, feedback parameters, etc. It is understood that such a system includes one or more processing elements, shown as controller 524, but may in fact be distributed among a variety of processing elements including any combination of digital logic and/or computing devices connected to some or all of various actuators, sensors and user interface elements, displays, output devices and networks, wired and/or wireless. The system actions, data acquisition, and data processing described in this disclosure, in many cases, are the result of logical sequences and/or computer programs/applications executing form memory on the processing elements.

Controller 524 can also provide computation and analysis on any of the input signals to produce a compositional maps and/or spectra 528 based on the measured probe response. The compositional map is a map of the distribution of one or more material components in a heterogeneous sample. At any position on the sample it is also possible to obtain an IR absorption spectrum (i.e. measurements of the probe response as a function of wavelength or wavenumber). In the case that surface sensitive spectra are desired, the system can be used to measure a resonant frequency of the probe in interaction with the sample surface and/or the phase of the cantilever resonance. This frequency and/or phase as a function or the IR wavelength or wavenumber can generate surface sensitive spectra as shown in FIG. 3.

Note that there are multiple ways that the cantilever resonance frequency and/or phase can be determined. In one embodiment, the frequency and/or phase can be determined by pulsing or modulating the IR source 514 at a frequency $f_m$ that is substantially near a resonance frequency of the AFM probe. In this case, the IR absorption of the sample and/or probe can induce a force on the probe tip to drive it into oscillation. Then the detector 520 can record the oscillatory response of the cantilever 500 to determine resonance frequencies and/or the oscillation phase. It is alternatively possible to use other means to drive the cantilever into oscillation to measure the cantilever resonance and/or phase. For example a pizeo actuator 510 may be driven by oscillation drive 512 at or near a cantilever resonance. As mentioned previously, alternative drive schemes may also be employed, for example electrostatic, magnetic, ultrasound, thermal bending, bimetallic bending, photothermal excitation, or other techniques that can apply an oscillatory force to the cantilever. A phase locked look can be implemented to dynamically track the temperature dependent changes in the resonance frequency. Thus local absorption spectra can be created by measuring the change in resonance frequency as a function of the wavelength or wavenumber of the incident radiation.

In one embodiment the probe response is detected at a "sideband frequency" that results from the nonlinear mixing of forces in the region of tip sample interaction that results in the generation of force components at sum and difference frequencies of the frequencies of tip and sample excitation. More specifically if the cantilever is oscillated at a frequency $f_1$ and the radiation incident on the sample is modulated at frequency $f_m$, in the presence of a nonlinear mixing force, there will be frequency components at "sideband frequencies" fib, i.e. sum and difference frequencies, where $f_{sb} = |\pm f_1 \pm f_m|$. (Or more generally linear combinations of any integer harmonics of these frequencies.)

The presence of probe response at sideband frequencies can come about by the following process. Consider a situation in which the tip-sample force has both linear and nonlinear terms based on the relative tip-sample separation. For example, to just quadratic terms, the tip sample force may be written as:

$$F_{ts} = k(z_s z_t) + \gamma(z_d z_t)^2; \qquad \text{Eq. 1:}$$

where $k_s$ is the sample's linear contact stiffness, $z_s$ and $z_t$ are the sample position and the tip position respectively. The sample motion term $z_s$ is wavelength dependent and contains information about the sample's optical properties and/or IR absorption. The gamma term is the constant of proportionality to any quadratic dependence of the tip-sample force on tip-sample separation and as such is a term that is indicative of a nonlinear tip-sample interaction. (It is also proportional to the $2^{nd}$ derivative of the tip sample force with separation.) If the motions of the tip and sample are periodic, the terms $z_s$ and $z_t$ will have Fourier components:

$$Z_{s1} = a_s \cos(2\pi f_m t) \text{ and} \qquad \text{Eq. 2:}$$

$$Z_{t1} = a_t \cos(2\pi f_{1t} + \varphi_{ts}); \qquad \text{Eq. 3:}$$

where $a_s$ and $a_t$ are the Fourier components of the tip and sample motion at the modulation frequency $f_m$ and the tip oscillation frequency $f_1$ respectively, and $\varphi_{ts}$ is the relative phase between the tip and sample motions. (If the motion of the tip and sample are non-sinusoidal, there will also be other Fourier components at higher harmonic frequencies, but we will omit them for simplicity in the current discussion.)

If we plug the values of $z_{s1}$ and $z_{t1}$ into Eq. 1 for $z_s$ and $z_t$, the quadratic term will be:

$$F_{ts2} = \gamma(Z_{s1} Z_{t1})^2 = \gamma(a_s \cos(2\pi f_{mt}) a_t \cos(2\pi f_{1t} + \varphi_{ts}))^2 \qquad \text{Eq. 4:}$$

When multiplied out, Eq. 4 the tip-sample force will contains a cross-term $F_{ts\_sb}$:

$$F_{ts\_sb} = 2\gamma a_s a_t \cos(2\pi f_{mt}) \cos(2\pi f_{1t} + \varphi_{ts}) \qquad \text{Eq. 5:}$$

This multiplication of the two cosines creates cross-terms (i.e. beat responses) at sum and difference frequencies of the tip and sample motion, i.e. at sideband frequencies $f_{sb}$:

$$f_{sb} = |\pm f_1 \pm f_m| \qquad \text{Eq. 6:}$$

If $f_{sb}$ is selected to correspond to a resonance of the cantilever, the detected amplitude will be preferentially enhanced. Alternately, if the frequencies of f1 and fm are fixed, but the sample's material properties change due to a sample temperature increase due to IR absorption, then the cantilever resonances will change. Thus measuring the shifts in the sideband frequency can produce a signal that is indicative of the IR absorption of the surface layer of the sample. Alternately or additionally, if the phase of the sideband frequency is measured as a function of IR illumination wavelength, it is possible to construct a spectrum of IR absorption of the surface layer of the sample.

The embodiments described herein are exemplary. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

The various illustrative logical blocks, optical and control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

We claim:

1. A method of obtaining a signal indicative of an infrared absorption spectrum of a surface layer of a sample with a probe of a scanning probe microscope, comprising the steps of:
   a. Interacting the probe with a surface layer of the sample;
   b. Illuminating the surface layer with a beam of infrared radiation;
   c. Measuring a probe response comprising at least one of a resonance frequency shift and a phase shift of a resonance of the probe in response to infrared radiation absorbed by the surface layer;
   d. Measuring the probe response at a plurality of wavelengths of the infrared radiation;
   e. Constructing a signal indicative of infrared absorption of the surface layer; and
   f. wherein the measuring probe response step comprises modulating an intensity of the beam of infrared radiation to induce an oscillatory response of the probe at or near a resonance of the probe.

2. The method of claim 1 wherein the surface layer is disposed on a substrate that also absorbs IR radiation over the plurality of wavelengths.

3. The method of claim 2 wherein the substrate is at least 10× thicker than the surface layer.

4. The method of claim 2 wherein the substrate is at least 100× thicker than the surface layer.

5. The method of claim 2 wherein the substrate is at least 800× thicker than the surface layer.

6. The method of claim 2 wherein the signal indicative of the IR absorption of the surface layer is at least 5× stronger than residual absorption bands from the substrate.

7. The method of claim 2 wherein residual absorption peaks from the substrate that appear in the signal indicative of the IR absorption of the surface layer are at least 8× smaller than absorption peaks measured on bare substrate without the surface layer.

8. The method of claim 1 wherein the probe is oscillated at a frequency wherein there is a substantially maximum slope of probe oscillation phase with resonance frequency shift.

9. The method of claim 1 wherein the measuring probe response step comprises oscillating the probe at or near a resonance of the probe with a piezoelectric actuator.

10. The method of claim 1 wherein the measuring probe response step comprises modulating the probe at or near a resonance of the probe with an actuator comprising at least one of: an electrostatic drive, a magnetic drive, an acoustic drive, an ultrasonic drive, a photothermal drive, a bimetallic drive, and joule heating thermal drive.

11. The method of claim 1 further comprising the step of linearizing the signal indicative of infrared absorption of the surface layer.

12. The method of claim 11 wherein the linearizing step comprises compensating for at least one of: nonlinear dependence of sample elasticity with temperature, nonlinear dependence of probe resonant frequency with sample elasticity, and nonlinear dependence of probe oscillation phase with resonance frequency shift.

13. The method of claim 12 wherein the linearizing step comprises measuring a probe response as a function of power of the beam of infrared radiation to create a linearization function.

14. The method of claim 13 wherein measuring probe response as a function of IR beam power is used to infer a relationship between probe response and sample temperature rise.

15. The method of claim 14 comprising the step of scaling the probe response at a plurality of wavelengths by the linearization function.

16. A scanning probe microscope (SPM) for measuring an infrared absorption spectrum of a sample with a probe, the SPM comprising:
   an oscillation drive to drive the probe to interact with a surface layer of the sample;
   an infrared radiation source to illuminate the surface layer with a beam of infrared radiation;
   a detector that measures a response of the surface layer to the beam of IR radiation with the probe, wherein the detector measures at least one of a resonance frequency shift and a phase shift of a resonance of the probe, and wherein the detector measures the response at a plurality of wavelengths of the infrared radiation; and
   a controller that constructs a signal indicative of infrared absorption of the surface layer; and
   wherein the oscillation drive drives the probe at a frequency so that there is a substantially maximum slope of probe oscillation phase with resonance frequency shift.

17. The SPM of claim 16 wherein the surface layer is disposed on a substrate that also absorbs IR radiation over the plurality of wavelengths.

18. The SPM of claim 16, wherein the signal indicative of the IR absorption of the surface layer is at least 5× stronger than residual absorption bands from the substrate.

* * * * *